United States Patent
Chen et al.

(10) Patent No.: US 9,178,440 B2
(45) Date of Patent: Nov. 3, 2015

(54) APPARATUS AND METHOD FOR RESONANT CONVERTERS

(71) Applicant: FutureWei Technologies, Inc., Plano, TX (US)

(72) Inventors: Daoshen Chen, Allen, TX (US); Heping Dai, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 147 days.

(21) Appl. No.: 14/033,060

(22) Filed: Sep. 20, 2013

(65) Prior Publication Data

US 2014/0307482 A1    Oct. 16, 2014

Related U.S. Application Data

(60) Provisional application No. 61/812,577, filed on Apr. 16, 2013.

(51) Int. Cl.
*H02M 3/335* (2006.01)
*H02M 3/337* (2006.01)
*H02J 1/00* (2006.01)
*H02M 7/48* (2007.01)

(52) U.S. Cl.
CPC .... H02M 3/3376 (2013.01); *H02M 2007/4815* (2013.01); *Y02B 70/1433* (2013.01)

(58) Field of Classification Search
CPC ........... Y02B 70/1433; Y02B 70/1475; Y02B 70/126; Y02B 70/1491; Y02B 20/348; H02M 3/33592; H02M 3/33507
USPC ................................ 363/15–17, 21.01–21.04
See application file for complete search history.

(56) References Cited

U.S. PATENT DOCUMENTS

| | | | |
|---|---|---|---|
| 6,930,893 B2 | 8/2005 | Vinciarelli | |
| 7,660,133 B1* | 2/2010 | Hwang et al. | 363/16 |
| 2011/0305045 A1 | 12/2011 | Guan et al. | |
| 2011/0305046 A1* | 12/2011 | Guan et al. | 363/21.02 |
| 2012/0106206 A1* | 5/2012 | Tang et al. | 363/21.02 |
| 2013/0201738 A1* | 8/2013 | Harrison et al. | 363/84 |

FOREIGN PATENT DOCUMENTS

| | | |
|---|---|---|
| CN | 101106335 A | 1/2008 |
| CN | 102281002 A | 12/2011 |
| EP | 0435459 A2 | 7/1991 |

OTHER PUBLICATIONS

International Search Report and Written Opinion of Patent Cooperation Treaty (PCT), International Application No. PCT/CN2014/075505, Applicant: Huawei Technologies Co., Ltd., Jul. 2, 2014, 15 pages.

* cited by examiner

*Primary Examiner* — Adolf Berhane
*Assistant Examiner* — Henry Lee, III
(74) *Attorney, Agent, or Firm* — Slater & Matsil, L.L.P.

(57) ABSTRACT

A method for improving a power converter's efficiency comprises providing a resonant converter, wherein the resonant converter comprises an input coupled to a power source, a plurality of power switches coupled to the input, a resonant tank coupled to the plurality of power switches and a controller coupled to the power switches and generating a plurality of gate drive signals for the power switches, wherein the gate drive signals are arranged such that a switching frequency of the resonant converter is in a frequency band.

17 Claims, 4 Drawing Sheets

FIG. 6

APPARATUS AND METHOD FOR RESONANT CONVERTERS

CROSS REFERENCE TO RELATED APPLICATIONS

This application is related to, and claims priority to U.S. Provisional Application No. 61/812,577, titled, "Apparatus and Method for Power Converters" filed on Apr. 16, 2013, which is herein incorporated by reference.

TECHNICAL FIELD

The present invention relates to a resonant converter, and, in particular embodiments, to a control mechanism for bus converter applications.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, inductor-inductor-capacitor (LLC) resonant converters and the like.

As technologies further advance, bus converters have been widely employed in the telecommunication industry. The bus voltages may be divided into three categories, a 12V bus voltage converted from a 48V input dc power supply, a 48V bus voltage converted from a 380V input dc power supply and a 12V bus voltage converted from a 380V input dc power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof and/or the like. The downstream non-isolated power converters operate under a tight control loop so that fully regulated output voltages are fed into their respective loads.

SUMMARY OF THE INVENTION

These and other problems are generally solved or circumvented, and technical advantages are generally achieved, by preferred embodiments of the present invention which provide a resonant power converter having high efficiency as well as a better regulation in comparison with an unregulated power converter.

In accordance with an embodiment, a converter comprises an input coupled to a power source, a plurality of power switches coupled to the input, a resonant tank coupled to the plurality of power switches and a controller coupled to the power switches, wherein the controller is configured to generate a plurality of gate drive signals for the power switches, and wherein the gate drive signals are arranged such that a switching frequency of the converter is in a frequency band.

In accordance with another embodiment, a method comprises providing a resonant converter, wherein the resonant converter comprises an input coupled to a power source, a plurality of power switches coupled to the input, a resonant tank coupled to the plurality of power switches and a controller coupled to the power switches.

The method further comprises generating a plurality of gate drive signals for the power switches, wherein the gate drive signals are arranged such that a switching frequency of the resonant converter is in a frequency band.

In accordance with yet another embodiment, a method comprises providing a resonant converter. The resonant converter comprises a power stage and a control stage.

The power stage comprises an input coupled to a power source, a plurality of power switches coupled to the input, a resonant tank coupled to the plurality of power switches, an isolation device coupled to the resonant tank and an output coupled to the isolation device through a rectifier.

The control stage is coupled to the power switches, wherein the control stage receives signals from both the input and the output of the power stage.

The method further comprises generating a plurality of gate drive signals for the power switches, wherein the gate drive signals are arranged such that a switching frequency of the resonant converter is in a frequency band.

An advantage of a preferred embodiment of the present invention is improving a power converter's efficiency as well as regulation through operating the power converter in a frequency band.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a boundary control scheme for an inductor-inductor-capacitor (LLC) resonant converter. The invention may also be applied, however, to a variety of resonant converters. Hereinafter, various embodiments will be explained in detail with reference to the accompanying drawings.

Figure 1:
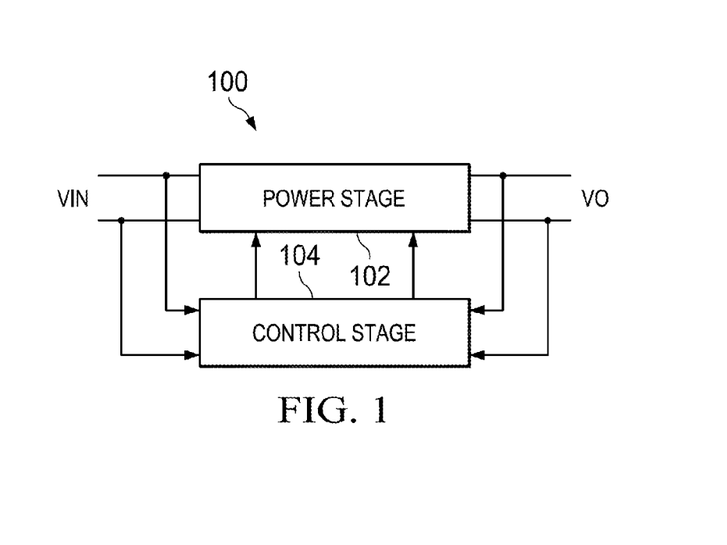
FIG. 1 illustrates a block diagram of a power converter in accordance with various embodiments of the present disclosure.

FIG. 1 illustrates a block diagram of a power converter in accordance with various embodiments of the present disclosure. The power converter 100 includes a power stage 102 and a control stage 104. In some embodiments, the power stage 102 may be a three-element resonant converter topology such as an LLC resonant converter, an inductor-capacitor-inductor (LCL) resonant converter and/or the like. The power stage 102 may be a two-element resonant converter topology such as an inductor-capacitor (LC) resonant converter and/or the like. Furthermore, the power stage 102 may be a higher order resonant converter topology such as an LCLC resonant converter, an LCLCL resonant converter and/or the like.

The control stage 104, as shown in FIG. 1, detects signals from both the input of the power converter 100 and the output of the power converter 100. The detected signals may include the input voltage, the input current, the power processed by the power stage 102, the output voltage, the output current, the operating temperature and/or the like.

Furthermore, based upon the detected signals, the control stage 104 may generate a plurality of gate drive signals, which are fed into the power stage 102 as shown in FIG. 1. The control mechanisms of generating the gate drive signals include feed-forward control mechanisms, feedback mechanisms, any combinations thereof and/or the like.

The gate drive signals sent from the control stage 104 to the power stage 102 are used to control the switching frequency of the switching elements (not shown but illustrated in FIG. 2) of the power stage 102. As a result, the output voltage of the power converter 100 may vary in response to different gate drive signals.

In response to different operation conditions, the control stage 104 may generate different gate drive signals accordingly. In particular, the gate drive signals may determine the switching frequency of the power stage 102. For example, the power stage 102 is a resonant converter such as an LLC resonant converter. A variation of the switching frequency of the resonant converter may lead to a gain variation, which may lead to an output voltage variation at the output of the LLC resonant converter. The power converter control characteristics of an LLC resonant converter are well known in the art, and hence are not discussed in further detail to avoid repetition.

Figure 2:
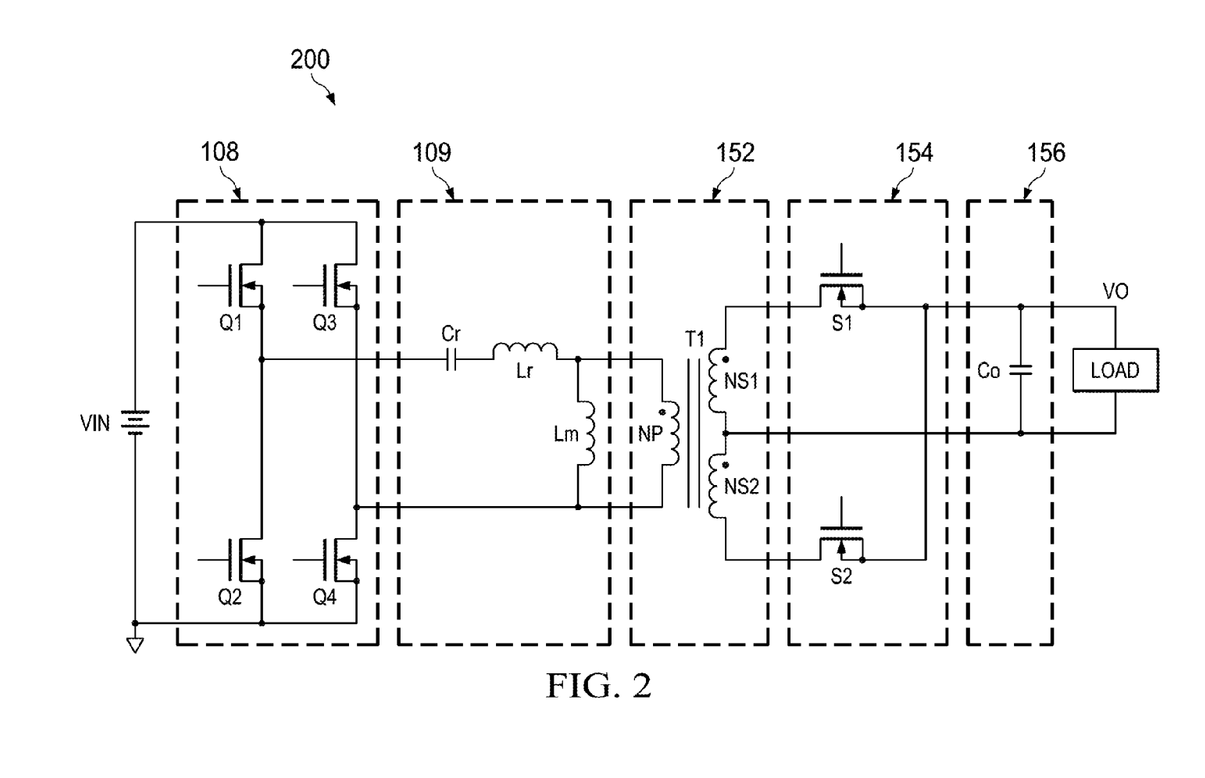
FIG. 2 illustrates a schematic diagram of an LLC resonant converter in accordance with various embodiments of the present disclosure.

FIG. 2 illustrates a schematic diagram of an LLC resonant converter in accordance with various embodiments of the present disclosure. The LLC resonant converter 200 is coupled between an input dc power source VIN and a load. The input dc power source VIN may be telecommunication power supplies converting a utility line voltage to a dc voltage. Alternatively, the input dc power source VIN may be a solar panel array. Furthermore, the input dc power source VIN may be an energy storage device such as rechargeable batteries, fuel cells and/or the like. The load represents the power consumed by a circuit coupled to the LLC resonant converter 200. Alternatively, the load may refer to downstream converters coupled to the output of the LLC resonant converter 200.

The LLC resonant converter 200 may comprise a switch network 108, a resonant tank 109, a transformer 152, a rectifier 154 and an output filter 156. As shown in FIG. 2, the switch network 108, the resonant tank 109, the transformer 152, the rectifier 154 and the output filter 156 are coupled to each other and connected in cascade between the input dc power source VIN and the load.

Figure 3:
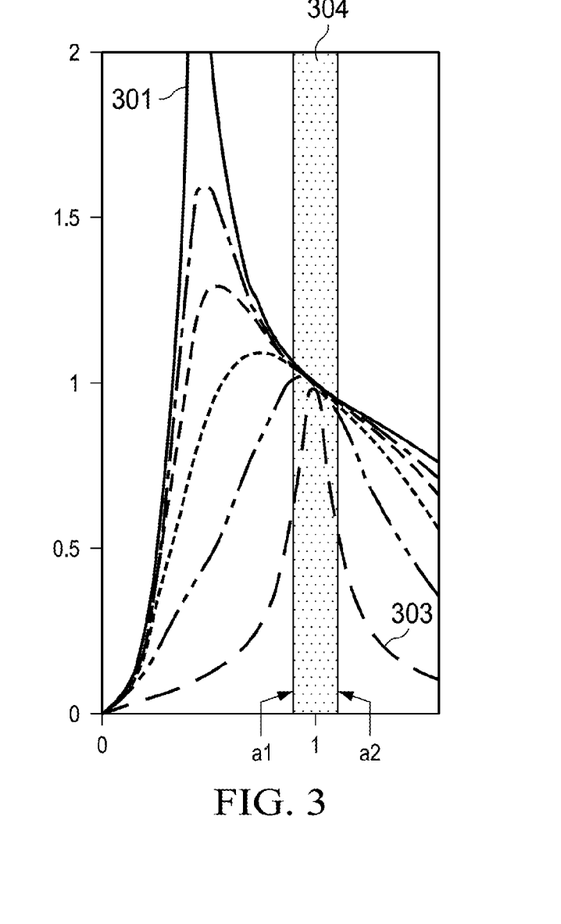
FIG. 3 illustrates the voltage gain of the power converter shown in FIG. 2 in accordance with various embodiments of the present disclosure.

The switch network 108 includes four switching elements, namely Q1, Q2, Q3 and Q4. As shown in FIG. 3, a first pair of switching elements Q1 and Q2 are connected in series. A second pair of switching elements Q3 and Q4 are connected in series. The common node of the switching elements Q1 and Q2 is coupled to a first input terminal of the resonant tank 109. Likewise, the common node of the switching elements Q3 and Q4 is coupled to a second input terminal of the resonant tank 109.

As shown in FIG. 2, the switching elements Q1, Q2, Q3 and Q4 may form a primary side switching network of a full bridge converter. According to some embodiments, switching elements Q1, Q2, Q3 and Q4 are implemented as MOSFET or MOSFETs connected in parallel.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the switch network 108 shown in FIG. 2 includes the primary side switches of a full bridge resonant converter according to some embodiments. Alternatively, the switch network 108 may be of the primary side switches of other bridge converters such as a half-bridge resonant converter, a push-pull resonant converter, any combinations thereof and the like.

It should further be noted that while FIG. 2 illustrates four switches Q1, Q2, Q3, and Q4, various embodiments of the present disclosure may include other variations, modifications and alternatives. For example, a separate capacitor (not shown) may be connected in parallel with each switch (e.g., switch Q1) of the primary side switching network 108. Such a separate capacitor helps to better control the timing of the resonant process of the LLC resonant converter 200.

FIG. 2 shows that the resonant tank 109 is formed by a resonant inductor Lr, a resonant capacitor Cr and the magnetizing inductance Lm of the transformer 152. As shown in FIG. 2, the resonant inductor Lr and the resonant capacitor Cr are connected in series and further coupled between a first terminal of the primary side of the transformer 152 and a common node of the switches Q1 and Q2.

As shown in FIG. 2, the inductor connected in parallel with the transformer 152 may be implemented as a magnetizing inductance of the transformer 152. Alternatively, the resonant inductor Lr may be implemented as external inductors.

The configuration of the resonant tank 109 described above is merely an example. There may be many variation, alternatives and modifications. For example, the resonant inductor Lr may be implemented as a leakage inductance of the transformer 152. In addition, the inductor connected in parallel with the transformer 152 may be implemented as a separate inductor connected in parallel with the primary side of the transformer 152.

The transformer 152 may be of a primary winding NP, a first secondary winding NS1 and a second secondary winding NS2. The primary winding NP is coupled to the resonant tank 109 as shown in FIG. 2. The secondary windings are coupled to the load 112 through the rectifier 154.

It should be noted that the transformers illustrated herein and throughout the description are merely examples, which should not unduly limit the scope of the claims. One of ordinary skill in the art would recognize many variations, alternatives, and modifications. For example, the transformer 152 may further comprise a variety of bias windings and gate drive auxiliary windings.

It should further be noted the transformer structure shown in FIG. 2 is merely an example. One person skilled in the art will recognize many alternatives, variations and modification. For example, the transformer 152 may be a non-center tapped transformer coupled between the primary side switching network and the rectifier 154. The secondary side employs a full-wave rectifier formed by four switching elements. The operation principle of a rectifier coupled to a center tapped transformer secondary side is well known, and hence is not discussed in further detail herein.

It should be noted that the power topology of the LLC resonant converter 200 may be not only applied to a rectifier as shown in FIG. 2, but also applied to other secondary configurations, such as voltage doubler rectifiers, current doubler rectifiers, any combinations thereof and/or the like.

The rectifier 154 converts an alternating polarity waveform received from the output of the transformer 152 to a single polarity waveform. When the transformer 152 is of a center tapped secondary, the rectifier 154 may be formed of a pair of switching elements such as n-type metal oxide semiconductor (NMOS) transistors. Alternatively, the rectifier 154 may be formed of a pair of diodes. On the other hand, when the transformer is of a single secondary winding, the rectifier 154 may be a full-wave rectifier coupled to the single secondary winding of the transformer 152.

Furthermore, the rectifier 154 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 154 are well known in the art, and hence are not discussed herein.

The output filter 156 is used to attenuate the switching ripple of the LLC resonant converter 200. According to the operation principles of isolated dc/dc converters, the output filter 156 may be an L-C filter formed by an inductor and a plurality of capacitors. One person skilled in the art will recognize that some isolated dc/dc converter topologies such as forward converters may require an L-C filter.

On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 156 are within various embodiments of the present disclosure.

FIG. 3 illustrates the voltage gain of the power converter shown in FIG. 2 in accordance with various embodiments of the present disclosure. The horizontal axis of FIG. 3 represents a normalized switching frequency of the LLC resonant converter 200. The vertical axis of FIG. 3 represents a voltage gain of the LLC resonant converter 200. In some embodiments, when the switching frequency is equal to the resonant frequency of the resonant tank, the voltage gain of the LLC resonant converter 200 is approximately equal to 1. In other words, when the normalized frequency is equal 1 as shown in FIG. 3, the output voltage of the LLC resonant converter 200 is approximately equal to the input voltage of the LLC resonant converter 200.

In some embodiments, the resonant frequency is about 1 MHz. At the resonant frequency, the LLC resonant converter 200 may achieve high efficiency because of zero voltage switching and/or zero current switching.

FIG. 3 includes a plurality of curves, which illustrate the voltage gain variations depending different loads. For example, at a light load, the voltage gain (e.g., curve 301 shown in FIG. 3) of the LLC resonant converter 200 may be greater than that of a full load (e.g., curve 303 shown in FIG. 3).

FIG. 3 shows the LLC resonant converter 200 may be of different voltage gain characteristics depending on different switching frequencies. As shown in FIG. 3, under a boundary control scheme, the switching frequency of the LLC resonant converter 200 may vary from a1 to a2. As shown in FIG. 3, the switching frequencies a1 and a2 may form a frequency band 304. More particularly, the frequency band 304 includes the resonant frequency of the resonant tank of the LLC resonant converter 200. As shown in FIG. 3, the corresponding input/output voltage gain at the resonant frequency is approximately equal to 1 at the vertical axis.

In some embodiments, a1 is approximately equal to 90% of the resonant frequency. Likewise, a2 is approximately equal to 110% of the resonant frequency. In alternative embodiments, a1 is approximately equal to 95% of the resonant frequency. Likewise, a2 is approximately equal to 105% of the resonant frequency. It should be noted that the actual switching frequency of the LLC resonant converter 200 is within the frequency band 304. The selection of the actual switching frequency may vary depending on different applications and design needs.

In some embodiments, the selection of the frequency band 304 may depend on a variable reference function, which is incorporated in the control stage 104. In other words, there may be a feedback loop applied to the control stage 104. However, the reference of the feedback loop is not fixed. Instead, the reference of the feedback loop follows the variable reference function, which limits the range of the output voltage so as to improve the regulation of the LLC resonant converter 200.

The variable reference function may be predetermined in consideration with a variety of operating parameters and electrical characteristics such as the input voltage, the input current, the output voltage, the output current, the power processed by the LLC resonant converter 200, the operating temperature, any combinations thereof and/or the like. Alternatively, the variable reference function may be calculated in real time in consideration with the variety of operating parameters and electrical characteristics described above.

In some embodiments, the variable reference function may be given by the following equation:

$$V_{REF}(w) = \frac{w^2 \cdot L_m \cdot C_r \cdot R_{eq} \cdot V_{IN}}{\sqrt{(w^2 \cdot L_m \cdot C_r + w^2 \cdot L_r \cdot C_r - 1)^2 \cdot R_{eq}^2 + w^2 \cdot L_m^2 \cdot (1 - w^2 \cdot L_r \cdot C_r)^2}} \quad (1)$$

In the equation above, w is the angular frequency of the switching frequency fs. Lm is a magnetizing inductance, Cr is a resonant capacitance of the resonant tank, Req is an equivalent resistance, VIN is an input voltage, Lr is a resonant inductance of the resonant tank.

In some embodiments, Cr is approximately equal to 360 nF. Lr is approximately equal to 70 nH. Lm is about 3.6 uH.

In some embodiments, the resistance of the equivalent resistor can be given by the following equation:

$$R_{eq} = \frac{8 \cdot R_o \cdot n^2}{\pi^2} \quad (2)$$

where $R_o$ is the load resistance and n is the transformer ratio of the LLC resonant converter 200 shown in FIG. 2.

The equation above for determining the value of $R_{eq}$ is merely an example, which should not unduly limit the scope of the claims. One of ordinary skill in the art would recognize many variations, alternatives, and modifications.

Since the range of the output voltage is limited under the variable reference function, the gain as well as the switching frequency of the LLC resonant converter 200 is limited in a range. In some embodiments, by employing such a variable reference function, the gain and the switching frequency of the LLC resonant converter 200 are within a frequency band (e.g., frequency band 304 as shown in FIG. 3).

It should be noted that the frequency band 304 shown in FIG. 3 is not fixed. Instead, depending on different operation conditions, the frequency band 304 may vary accordingly. For example, the voltage gain variation of an LLC resonant converter 200 under a light load is greater than that under a heavy load. As such, the control stage 104 may detect the load current and adjust the frequency band 304 accordingly. In particular, the frequency band 304 at a light load condition may be narrower than the frequency band 304 under a full load condition.

In some embodiments, when the LLC resonant converter 200 operates at a stable operating condition, the switching frequency of the LLC resonant converter 200 may be fixed. In alternative embodiments, under a stable operating condition, the switching frequency of the LLC resonant converter 200 may gradually vary between the lower frequency limit a1 to the upper frequency limit a2. Such a gradual frequency variation helps to improve the electrical characteristics of the LLC resonant converter 200. For example, the electromagnetic interference (EMI) performance of the LLC resonant converter 200 may be improved through varying the switching frequency between the lower limit and the upper limit.

In the frequency band 304, the switching frequency variation process may be carried out in a linear manner. In response to an operating condition change such as an input voltage variation, an input current variation, a power level variation, an output voltage variation, an output current variation, an operating temperature variation and any combinations thereof, the control stage 104 is configured to vary the frequency of the gate drive signals from a first switching frequency to a second switching frequency. Both the first switching frequency and the second switching frequency are within the frequency band 304.

On the other hand, the switching frequency variation process may be carried out in a non-linear manner. For example, the control stage 104 may be implemented as a digital controller. As a result, the frequency variation process may include a plurality of frequency variations steps, each of which is a frequency jump.

In some embodiments, according to the gain curves and the frequency band 304 shown in FIG. 3, in response to an input voltage drop, the switching frequency of the LLC resonant converter 200 varies from a first switching frequency to a second switching frequency, wherein the second switching frequency generates a second gain of the resonant converter and the first switching frequency generates a first gain of the resonant converter. The second gain is greater than the first gain and the second switching frequency is less than an upper limit of the frequency band 304.

On the other hand, in response to an input voltage increase, the switching frequency of the LLC resonant converter 200 varies from a first switching frequency to a second switching frequency, wherein the second switching frequency generates a second gain of the resonant converter and the first switching frequency generates a first gain of the resonant converter. The first gain is greater than the second gain and the second switching frequency is greater than a lower limit of the frequency band 304.

An advantageous feature of the embodiment described above is that the LLC resonant converter 200 may achieve high efficiency in comparison with a fully regulated resonant converter. On the other hand, the LLC resonant converter 200 may be of a better regulation in comparison with an open-loop resonant converter.

Figure 4:
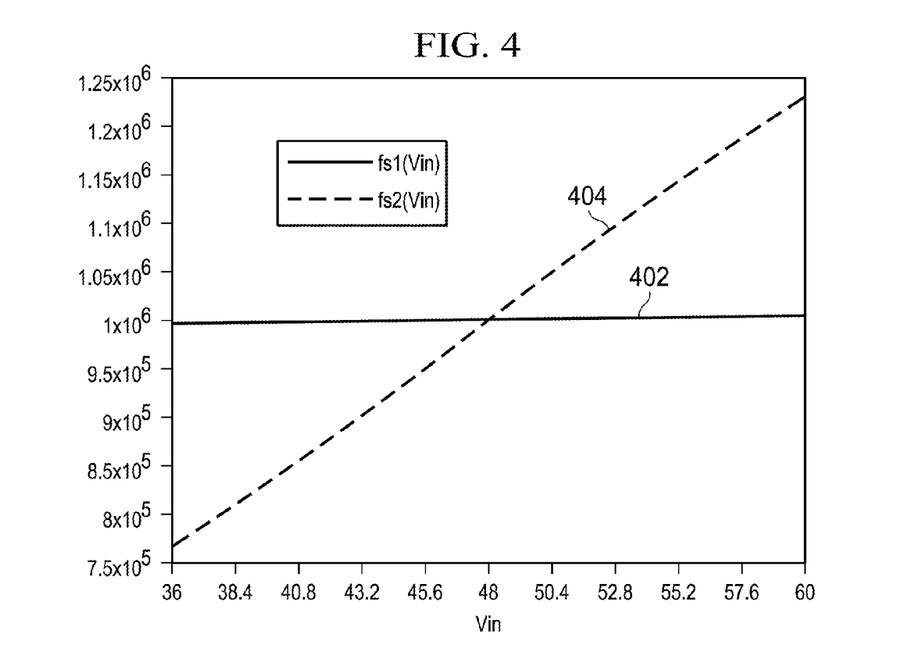
FIG. 4 illustrates a first illustrative frequency band in accordance with various embodiments of the present disclosure.

FIG. 4 illustrates a first illustrative frequency band in accordance with various embodiments of the present disclosure. The horizontal axis of FIG. 4 represents an input voltage of the LLC resonant converter 200. The vertical axis of FIG. 4 represents the switching frequency of the LLC resonant converter 200. In some embodiments, the input voltage may vary from 36 V to 60 V. A curve 402 represents the switching frequency variation when the LLC resonant converter 200 is under full load. On the other hand, a curve 404 represents the switching frequency variation when the LLC resonant converter 200 is under light load (e.g., 1% of the full load of the LLC resonant converter 200).

The switching frequency variations shown in FIG. 4 may be determined by the following equation:

$$f_s = \left\{ k1 \cdot f_r + k2 \cdot f_r \cdot \tanh\left[ k3 \cdot \frac{I_{o\_max}}{I_o} \cdot \frac{V_{IN} - V_{NORM}}{V_{NORM}} \right] \right\} \cdot \text{Co\_eff}(Temp) \quad (3)$$

where fr is the resonant frequency of the LLC resonant converter 200, $V_{NORM}$ is the normal input voltage, which is about 48 V for a telecommunication application.

In some embodiments, Co_eff(Temp) and k1 are approximately equal to 1. The values of k2 and k3 may be in a wide range. Curves 402 and 403 are obtaining by setting k1 equal to 1, Co_eff(Temp) equal to 1, k2 equal to 0.5 and k3 equal to 0.02.

Figure 5:
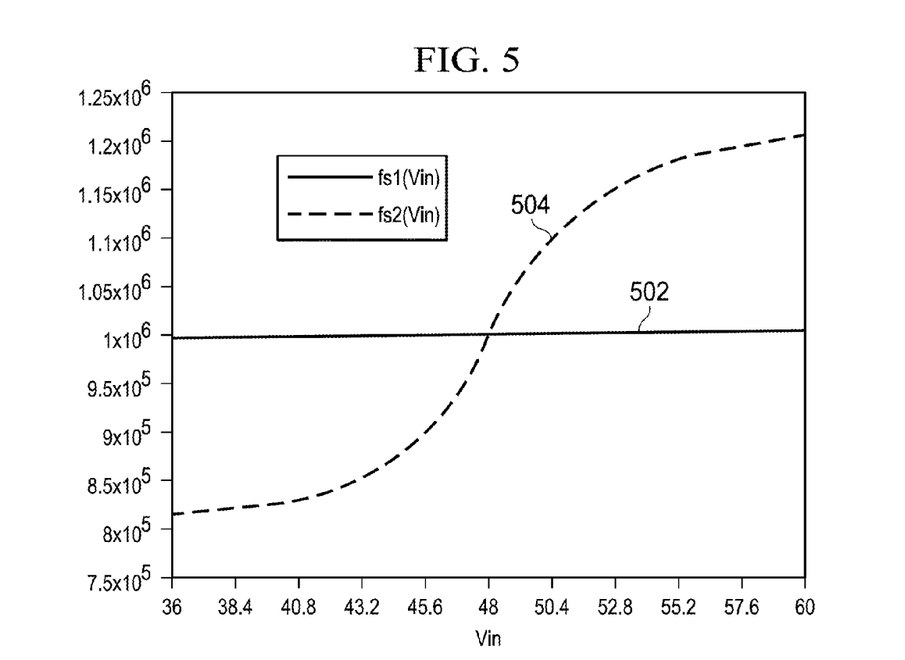
FIG. 5 illustrates a second illustrative frequency band in accordance with various embodiments of the present disclosure.

FIG. 5 illustrates a second illustrative frequency band in accordance with various embodiments of the present disclosure. The horizontal axis of FIG. 5 represents an input voltage of the LLC resonant converter 200. The vertical axis of FIG.

5 represents the switching frequency of the LLC resonant converter 200. The switching frequency variations shown in FIG. 5 are determined by equation (3) except that k2 and k3 are different. In some embodiments, k2 is equal to 0.2 and k3 is equal to 0.1. A curve 502 represents the switching frequency variation when the LLC resonant converter 200 is under full load. On the other hand, a curve 504 represents the switching frequency variation when the LLC resonant converter 200 is under light load (e.g., 1% of the full load of the LLC resonant converter 200).

It should be noted that the equation for determining the switching frequency is selected purely for demonstration purposes and are not intended to limit the various embodiments of the present invention to any particular function. One of ordinary skill in the art would recognize many variations, alternatives, and modifications. For example, tan h used in equation (3) can be replaced by sin h. A detailed description of a sin h based equation will be described below with respect to FIG. 6.

Figure 6:
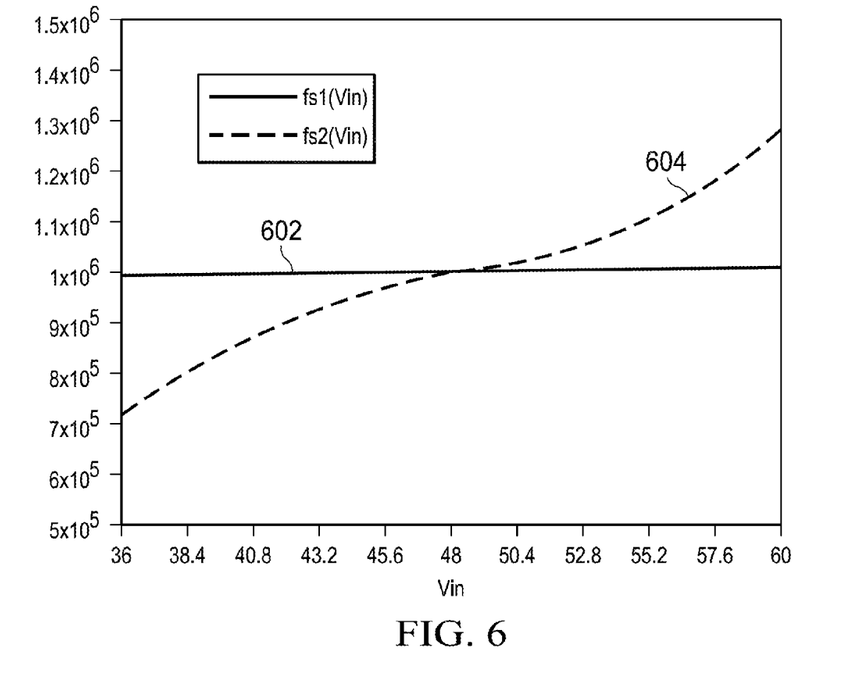
FIG. 6 illustrates a third illustrative frequency band in accordance with various embodiments of the present disclosure.

FIG. 6 illustrates a third illustrative frequency band in accordance with various embodiments of the present disclosure. The horizontal axis of FIG. 6 represents an input voltage of the LLC resonant converter 200. The vertical axis of FIG. 6 represents the switching frequency of the LLC resonant converter 200. A curve 602 represents the switching frequency variation when the LLC resonant converter 200 is under full load. On the other hand, a curve 604 represents the switching frequency variation when the LLC resonant converter 200 is under light load (e.g., 1% of the full load of the LLC resonant converter 200).

The switching frequency variations shown in FIG. 6 are determined by the following equation:

$$f_s = \left\{ k1 \cdot f_r + k2 \cdot f_r \cdot \sinh\left[k3 \cdot \frac{I_{O\_max}}{I_O} \cdot \frac{V_{IN} - V_{NORM}}{V_{NORM}}\right] \right\} \cdot \text{Co\_eff}(Temp) \quad (4)$$

It should be noted that Io_max/Io in equation (3) and equation (4) is merely an example. It can be replaced by Po_max/Po (output power), Pin_max/Pin (input power), Ir_max/Ir (the current in the resonant inductor or the current in the transformer winding), Is_max/Is (a sensed current in a power path or a sensed current detected from any components having a current proportional to the current or power level of the LLC resonant converter 200), Ro/Ro_min (impedance at full load), any combinations thereof and/or the like.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A converter comprising:
an input coupled to a power source;
a plurality of power switches coupled to the input;
a resonant tank coupled to the plurality of power switches; and
a controller coupled to the power switches, wherein the controller is configured to generate a plurality of gate drive signals for the power switches, and wherein the gate drive signals are arranged such that a switching frequency of the converter is in a frequency band, wherein the frequency band comprises an upper limit and a lower limit, and wherein the upper limit and the lower limit are adjacent to a resonant frequency of the resonant tank, and wherein the frequency band is determined through a control loop, and wherein a reference of the control loop is so arranged that the resonant frequency is within the frequency band, and wherein the reference follows a variable reference function, and wherein the variable reference function includes variables selected from the group consisting of an input voltage, an input current, an output voltage, an output current, an operating temperature.

2. The converter of claim 1, wherein:
the frequency band includes the resonant frequency of the resonant tank; and
the gate drive signals are generated by varying the switching frequency of the converter from the resonant frequency of the resonant tank.

3. The converter of claim 1, wherein:
in response to an input voltage change, the gate drive signals are generated by varying the switching frequency of the converter from a first switching frequency to a second switching frequency through a feed-forward control mechanism, and wherein the first switching frequency and the second switching frequency are within the frequency band.

4. The converter of claim 1, wherein:
in response to an output voltage change, the gate drive signals are generated by varying the switching frequency of the converter from a first switching frequency to a second switching frequency through a feedback control mechanism, and wherein the first switching frequency and the second switching frequency are within the frequency band.

5. The converter of claim 1, wherein:
in response to a load current change, the gate drive signals are generated by varying the switching frequency of the converter from a first switching frequency to a second switching frequency through a feedback control mechanism, and wherein the first switching frequency and the second switching frequency are within the frequency band.

6. The converter of claim 1, wherein:
in response to a power change, the gate drive signals are generated by varying the switching frequency of the converter from a first switching frequency to a second switching frequency through a feedback control mechanism, and wherein the first switching frequency and the second switching frequency are within the frequency band.

7. A method comprising:
providing a resonant converter, wherein the resonant converter comprises:
an input coupled to a power source;
a plurality of power switches coupled to the input;

a resonant tank coupled to the plurality of power switches; and a controller coupled to the power switches; and generating a plurality of gate drive signals for the power switches, wherein the gate drive signals are arranged such that a switching frequency of the resonant converter is in a frequency band, wherein the frequency band comprises an upper limit and a lower limit, and wherein the upper limit and the lower limit are adjacent to a resonant frequency of the resonant tank, and wherein the frequency band is determined through a control loop, and wherein a reference of the control loop is so arranged that the resonant frequency is within the frequency band, and wherein the reference follows a variable reference function, and wherein the variable reference function includes variables selected from the group consisting of an input voltage, an input current, an output voltage, an output current, an operating temperature.

8. The method of claim 7, further comprising:
operating the resonant converter in the frequency band, wherein the switching frequency of the resonant converter varies from a first switching frequency to a second switching frequency in response to an input voltage drop, and wherein:
the second switching frequency generates a second gain of the resonant converter; and
the first switching frequency generates a first gain of the resonant converter, and wherein:
the second gain is greater than the first gain; and
the second switching frequency is less than the upper limit of the frequency band.

9. The method of claim 7, further comprising:
operating the resonant converter in the frequency band, wherein the switching frequency of the resonant converter varies from a first switching frequency to a second switching frequency in response to an input voltage increase, and wherein:
the first switching frequency generates a first gain of the resonant converter; and
the second switching frequency generates a second gain of the resonant converter, and wherein:
the first gain is greater than the second gain; and
the second switching frequency is greater than the lower limit of the frequency band.

10. The method of claim 7, further comprising:
controlling the resonant converter through a feedback loop, wherein a reference of the feedback loop follows:

$$V_{REF}(w) = \frac{w^2 \cdot L_m \cdot C_r \cdot R_{eq} \cdot V_{IN}}{\sqrt{(w^2 \cdot L_m \cdot C_r + w^2 \cdot L_r \cdot C_r - 1)^2 \cdot R_{eq}^2 + w^2 \cdot L_m^2 \cdot (1 - w^2 \cdot L_r \cdot C_r)^2}}$$

where w is an angular frequency of the switching frequency, Lm is a magnetizing inductance, Cr is a resonant capacitance of the resonant tank, Req is an equivalent resistor, VIN is an input voltage, Lr is a resonant inductance of the resonant tank.

11. The method of claim 10, wherein:
the switching frequency is within the frequency band, and wherein the switching frequency is determined by a function.

12. A method comprising:
providing a resonant converter, wherein the resonant converter comprises:
a power stage comprising:
an input coupled to a power source;
a plurality of power switches coupled to the input;
a resonant tank coupled to the plurality of power switches;
an isolation device coupled to the resonant tank; and
an output coupled to the isolation device through a rectifier; and
a control stage coupled to the power switches, wherein the control stage receives signals from both the input and the output; and
generating a plurality of gate drive signals for the power switches, wherein the gate drive signals are arranged such that a switching frequency of the resonant converter is in a frequency band, wherein the frequency band comprises an upper limit and a lower limit, and wherein the upper limit and the lower limit are adjacent to a resonant frequency of the resonant tank, and wherein the frequency band is determined through a control loop, and wherein a reference of the control loop is so arranged that the resonant frequency is within the frequency band, and wherein the reference follows a variable reference function, and wherein the variable reference function includes variables selected from the group consisting of an input voltage, an input current, an output voltage, an output current, an operating temperature.

13. The method of claim 12, wherein:
the frequency band includes the resonant frequency of the resonant tank; and
the frequency band is in a range from about 90% of the resonant frequency of the resonant tank to about 110% of the resonant frequency of the resonant tank.

14. The method of claim 12, further comprising:
varying the switching frequency from a first switching frequency to a second switching frequency to achieve a better output voltage regulation, wherein the second switching frequency is within the frequency band.

15. The method of claim 12, further comprising:
varying the switching frequency from a first switching frequency to a second switching frequency to achieve a better output current regulation, wherein the second switching frequency is within the frequency band.

16. The method of claim 12, further comprising:
varying the switching frequency from a first switching frequency to a second switching frequency through a feedback control mechanism, wherein the second switching frequency is within the frequency band.

17. The method of claim 12, further comprising:
varying the switching frequency from a first switching frequency to a second switching frequency through a feed-forward control mechanism, wherein the second switching frequency is within the frequency band.

* * * * *